March 24, 1964 T. M. RICHARDSON 3,126,133
DISTRIBUTING DEVICE FOR COTTONSEED CAKE AND THE LIKE
Filed Aug. 23, 1962
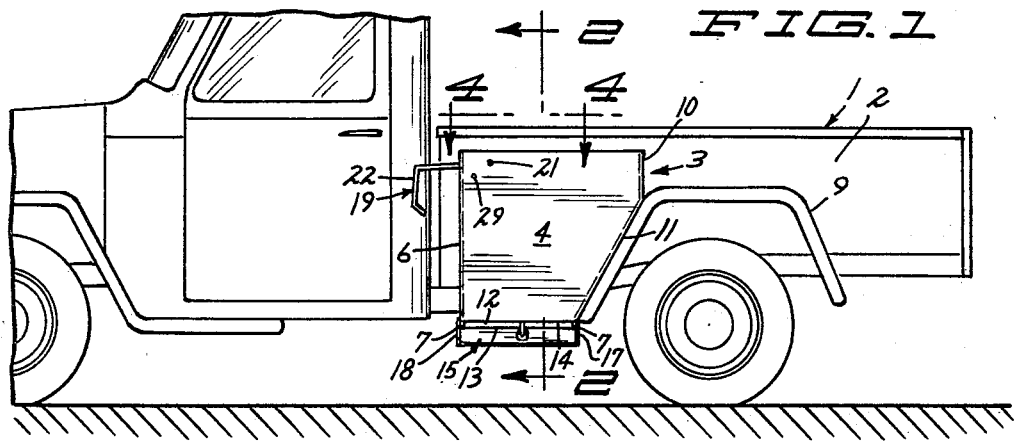
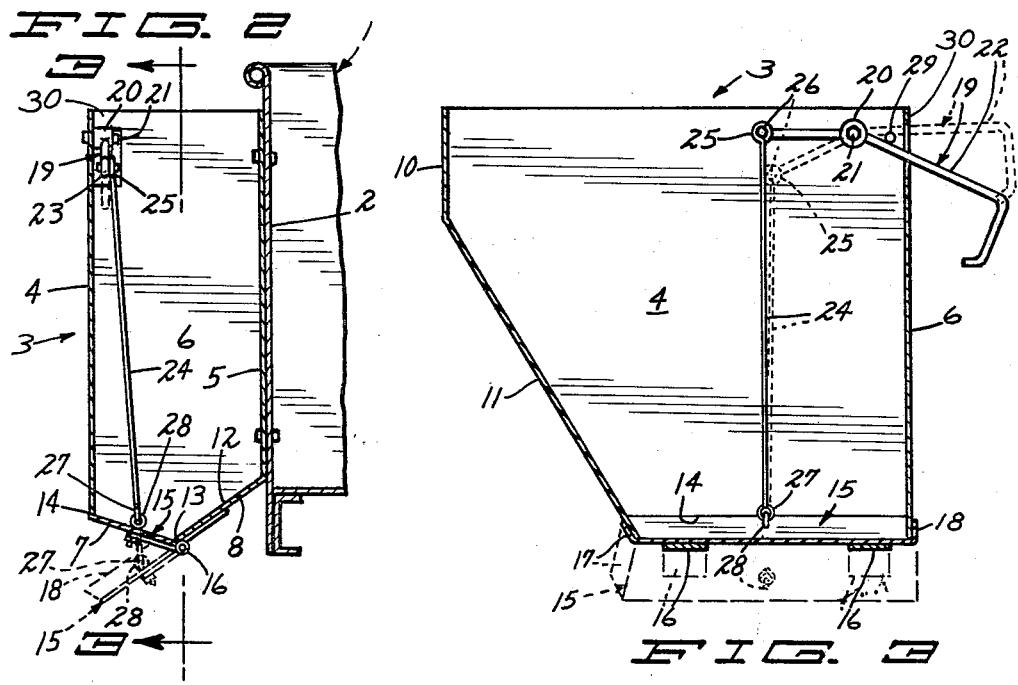
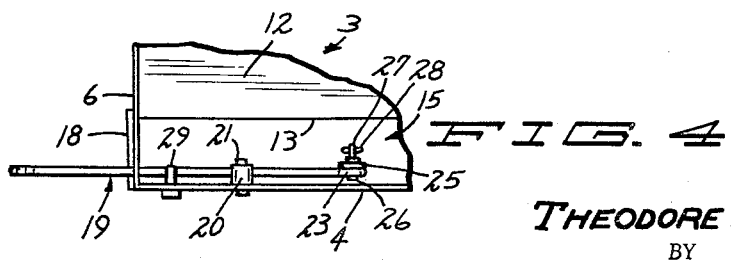
INVENTOR.
THEODORE M. RICHARDSON
BY
ATTORNEYS United States Patent Office 3,126,133
Patented Mar. 24, 1964

3,126,133
DISTRIBUTING DEVICE FOR COTTONSEED CAKE AND THE LIKE
Theodore M. Richardson, Murdo, S. Dak.
Filed Aug. 23, 1962, Ser. No. 218,908
1 Claim. (Cl. 222—505)

This invention relates generally to livestock feeding and distributing equipment, and more particularly it relates to a distributing device for cottonseed cake and the like.

Generally speaking, the present invention comprehends the provision of a bin structure adapted to be mounted on a moving vehicle, such as a tractor or truck, and further adapted to evenly distribute livestock feed, such as cottonseed cake, over the feeding area.

An important object of this invention resides in the provision of a distributing device for cottonseed cake which is constructed with a hingedly connected distributing door disposed adjacent the bottom thereof and adapted to distribute the feed in a generally uniform manner.

Another object of this invention is the provision of a distributing device for cottonseed cake in which the hingedly connected distributing door thereof is further adapted and arranged to act as a deflector for controlling the rate of distribution of the feed.

Another object of this invention resides in the provision of a distributing device for cottonseed cake and the like wherein the hingedly connected distributing door thereof is mounted for movements between a closed position and an open deflecting and distributing position, and wherein actuating mechanism is provided for opening and closing the distributing door so as to control the distribution of the feed.

A further object of this invention resides in the provision of a distributing device for cottonseed cake wherein the actuating mechanism thereof for the distributing door includes a retractable stop element for releasably holding the distributing door in its closed position.

Another object of this invention resides in the provision of a distributing device for cottonseed cake which efficiently distributes the feed in a desired manner, and which is therefore useful as a time and labor saving device.

Other objects of this invention reside in the provision of a device of the class described above which is simple in construction and therefore relatively economical to produce, which is strong and durable throughout long periods of continued use, and which is provided with a minimum of working parts so as to provide trouble free operation even in the coldest weather.

The above and still further objects and advantages of this invention will become apparent from a consideration of the following detailed specification, appended claims and attached drawings.

Referring to the drawings, wherein like reference characters indicate like parts or elements throughout the several views:

FIG. 1 is a view in elevation and showing the present invention secured in its operative position on a truck;

FIG. 2 is an enlarged view in vertical section taken on the line 2—2 of FIG. 1, and showing some portions thereof in an alternative position by dotted lines;

FIG. 3 is a view in vertical section taken on the line 3—3 of FIG. 2, and showing an alternative position of some portions thereof by dotted lines; and FIG. 4 is an enlarged view in horizontal section taken on the line 4—4 of FIG. 1, some portions being broken away.

Referring more particularly to the drawings, a pickup truck is shown therein, and the present invention is adapted for use in connection with said truck. The pick-up truck includes a box 1 having one side wall 2 thereof shown particularly in FIG. 2. The distributing device which comprises the present invention includes a bin structure, represented generally by the reference numeral 3, adapted for securement to the truck box side wall 2, in the general position shown particularly in FIGS. 1 and 2. The bin structure 3 comprises a front wall 4 and a back wall 5 secured to the truck box side wall 2. The bin structure 3 further comprises a side wall 6 secured between the front wall 4 and the back wall 5 and which defines adjacent its bottom lower downwardly diverging edge portions 7, 8, respectively.

The front and back walls 4, 5 of bin structure 3 are angularly formed so as to provide for the efficient utilization of the space defined by the truck forwardly of the rear fender 9 thereof, and the bin structure 3 further comprises an upper generally rectangular side wall portion 10 and a lower generally rectangular side wall portion 11.

In accordance with this invention, the bin structure 3 further comprises a bottom wall portion 12 which extends generally angularly downwardly from the back wall 5 of the bin structure 3 toward the direction of the front wall 4 and terminates with an edge portion 13 thereof disposed generally intermediate and parallel with the front and back walls 4, 5 of the bin structure 3. The bottom wall portion 12 is further disposed with its elongated edge portion 13 positioned below the bottom edge 14 of the front wall 4.

The present invention further comprises a distributing door, represented generally by the reference numeral 15, which is connected by means of a pair of axially spaced hinges 16 to the elongated edge portion 13 of the bottom wall portion 12. The distributing door 15 is movable between a closed position, shown by full lines in FIG. 2, wherein the same extends generally angularly upwardly from the elongated edge portion 13 of the bottom wall portion 12 to meet with the bottom edge 14 of the front wall 4 and an open deflecting and distributing position, shown by dotted lines in FIG. 2, wherein the distributing door 15 extends generally angularly downwardly in general planar alignment with the bottom wall portion 12. The distributing door 15 is provided with upturned side flanges 17, 18, respectively which are positioned so as to extend upwardly alongside the lower side wall portion 11 and the side wall 6.

For the purpose of controlling the movement of the hingedly connected distributing door 15, actuating mechanism is disclosed for opening and closing the distributing door 15. Such actuating mechanism comprises a lever 19 having a generally cylindrical journal portion 20 disposed intermediate its opposite end portions, as shown particularly in FIGS. 3 and 4. The journal portion 20 of the lever 19 is mounted on a generally horizontal shaft 21 rigidly secured to the front wall 4 of the bin structure 3 so as to adapt the lever 19 for pivotal or oscillatory movements. The lever 19 further defines a handle portion 22, and the other end portion of the lever 19 defines an eye portion 23. An elongated connecting link 24 defines an upper eye portion 25 which is pivotally secured to the lever 19 by means of a pivot pin 26. The connecting link 24 also defines a lower eye portion 27 which is connected to an eye bolt 28 securely fastened to the distributing door 15, as shown particularly in FIGS. 2 and 3.

The actuating mechanism noted above is arranged so that the upwardly or downwardly directed movement of the handle portion 22 of the lever 19 will be imparted to the distributing door 15 so as to move the same between its above noted opened and closed positions. The position of the lever 19 and its associated mechanism corresponding to the upper closed position of the distributing door 15 as shown by full lines in FIGS. 2 and 3, and the position of the lever 19 and associated mechanism corresponding to the open deflecting position of the distributing door 15 is shown by dotted lines in FIGS. 2 and 3. For the purpose of holding the lever 19 in the full line position thereof, shown in FIGS. 2 and 3, which corresponds to the closed upper position of the distributing door 15, a retractable stop element or stop pin 29 is provided, the same being slidably received in a suitable aperture defined in the front wall 4 of the bin structure 3. The distributing door 15 is held against movement beyond its open position by the horizontal portion 3 of the side wall 6, and against which the handle portion 22 of the lever 19 is positioned, as shown by dotted lines in FIG. 3.

With respect to the operation of this device, after the bin structure 3 has been filled with the feed material to be distributed, the vehicle upon which the bin structure 3 is mounted is then driven along the feeding area and the handle portion 22 is then moved so as to lower the distributing door 15 to its dotted line position shown in FIGS. 2 and 3 (or as shown by full lines in FIG. 1), so as to evenly distribute the feed over the feeding area. It is noted that the lever 19 is designed and constructed so that the handle portion 22 thereof is easily and quickly accessible from the cab of the truck or other vehicle upon which the bin structure 3 is mounted.

This invention has been thoroughly tested and found to be completely satisfactory for the accomplishment of the above objects; and while I have shown and described above a preferred embodiment thereof in which the principles of the present invention have been incorporated, I wish it to be specifically understood that the same may be modified without departure from the scope and spirit of the appended claim.

What I claim is:

A distributing device for cottonseed cake and the like, said distributing device comprising:

(a) a bin structure having side walls and front and back walls, said bin structure being adapted for securement to a rigid supporting structure, and one of said walls having an aperture therein, (b) said bin structure having a bottom wall portion which extends generally angularly downwardly from the back wall of said bin structure toward the direction of the front wall of said bin structure and terminates with an edge portion thereof disposed generally intermediate the front and back walls of said bin structure and below the bottom of said front wall, (c) a distributing door hingedly connected to the edge portion of said bottom wall portion and movable between a closed position wherein the same extends generally angularly upwardly from said bottom wall portion to meet with said front wall and an open deflecting and distributing position wherein the same extends generally angularly downwardly in general planar alignment with said bottom wall portion, and (d) actuating mechanism for opening and closing said distributing door whereby to control the distribution of said cottonseed cake, said actuating mechanism comprising:

(1) a lever equipped with a handle at its one portion, said handle projecting through said aperture in said one of the bin walls, (2) means within said bin structure for pivotally securing said lever intermediate its opposite end portions to said bin structure, (3) an elongated connecting link located within said bin structure and pivotally secured to the other end portion of said lever and also to said distributing door, and (4) a retractable stop element for releasably holding said lever in a position corresponding to a closed position of said distributing door.

References Cited in the file of this patent

UNITED STATES PATENTS

| 766,527 | Rogers | Aug. 2, 1904 |
|---|---|---|
| 1,026,641 | Gardner | May 14, 1912 |
| 2,253,248 | Palmer | Aug. 19, 1941 |
| 2,299,702 | Mosel | Oct. 20, 1942 |
| 2,822,957 | Johnson | Feb. 11, 1958 |

FOREIGN PATENTS

| 20,362 | Germany | Dec. 8, 1882 |
|---|---|---|
| 1,202,025 | France | Jan. 7, 1960 |